Figure 10:
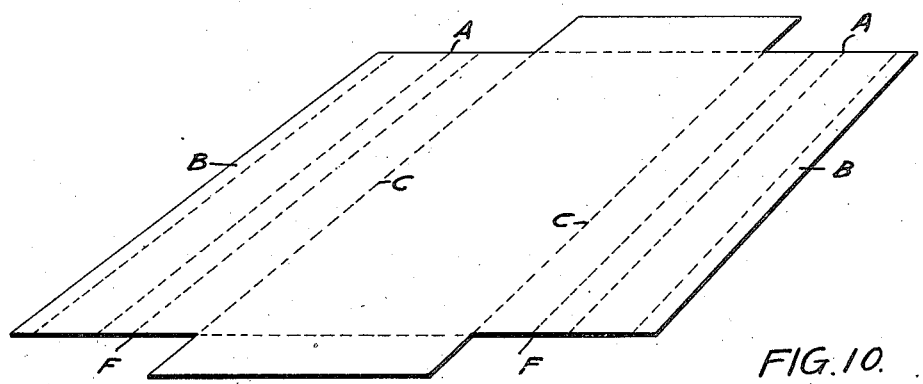
Figure 11:
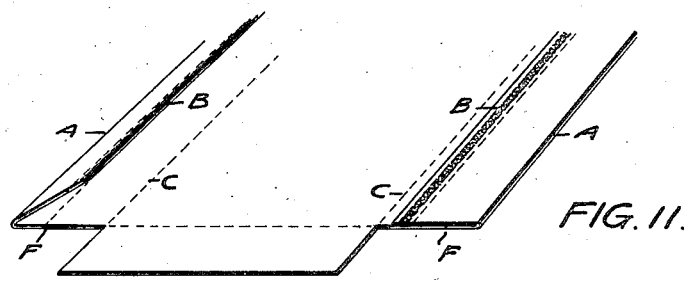

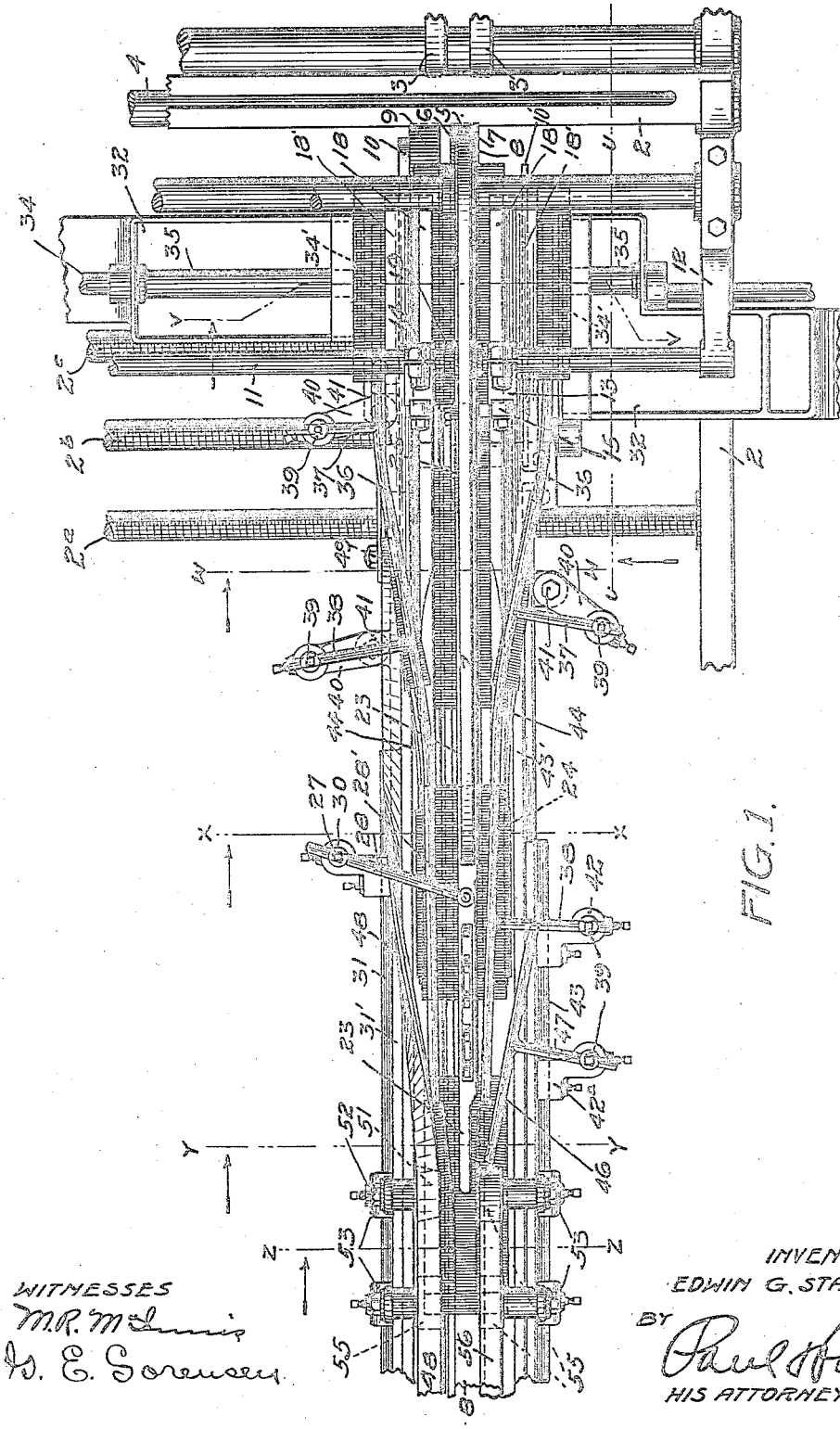

E. G. STAUDE.
FLEXIBLE BOX MACHINE.
APPLICATION FILED JUNE 19, 1911.
1,123,945.
Patented Jan. 5, 1915.
5 SHEETS—SHEET 2.
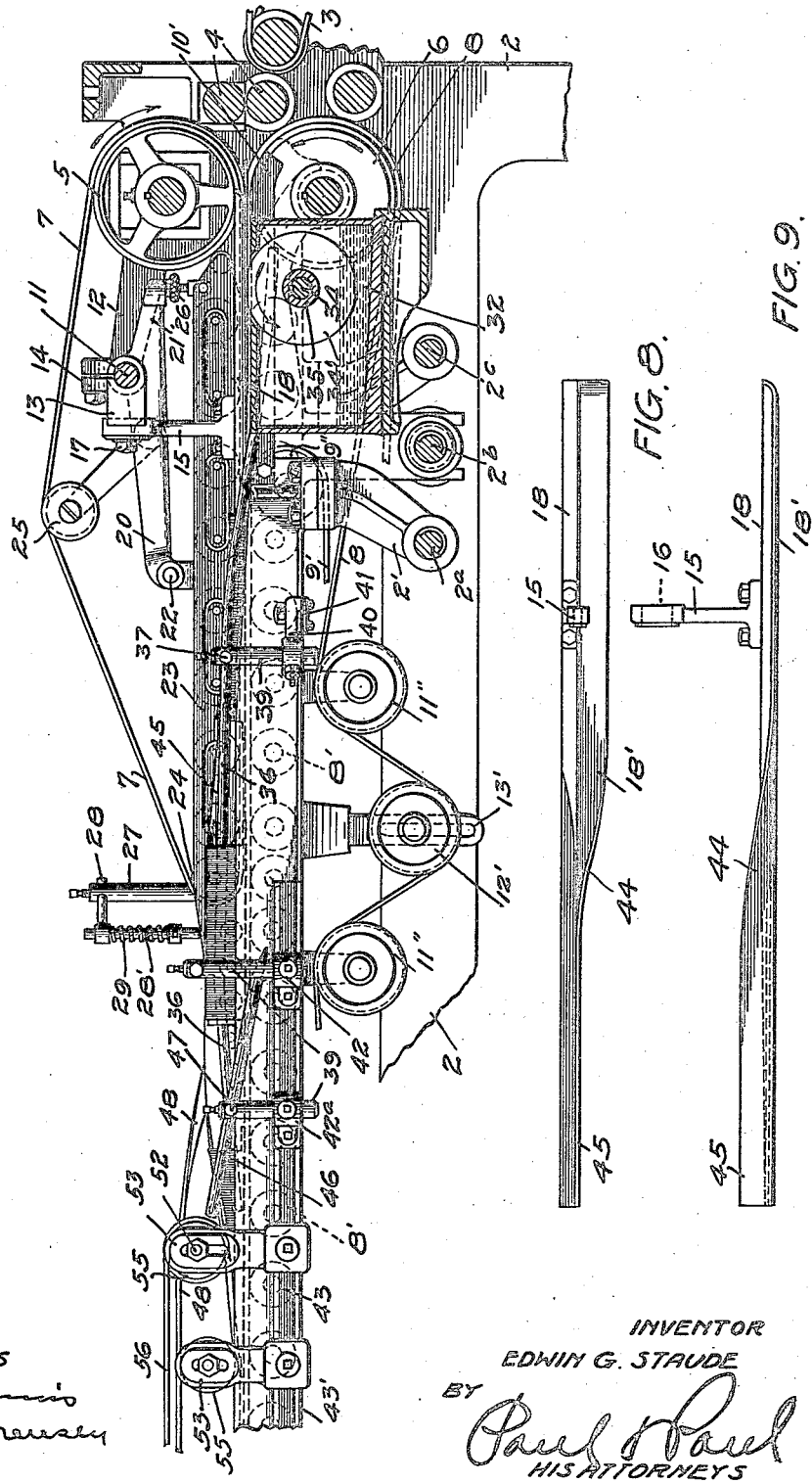
WITNESSES
M. R. McLewis
W. E. Sorensen
INVENTOR
EDWIN G. STAUDE
BY
Paul & Paul
HIS ATTORNEYS E. G. STAUDE.
FLEXIBLE BOX MACHINE.
APPLICATION FILED JUNE 19, 1911.
1,123,945.
Patented Jan. 5, 1915.
5 SHEETS—SHEET 3.
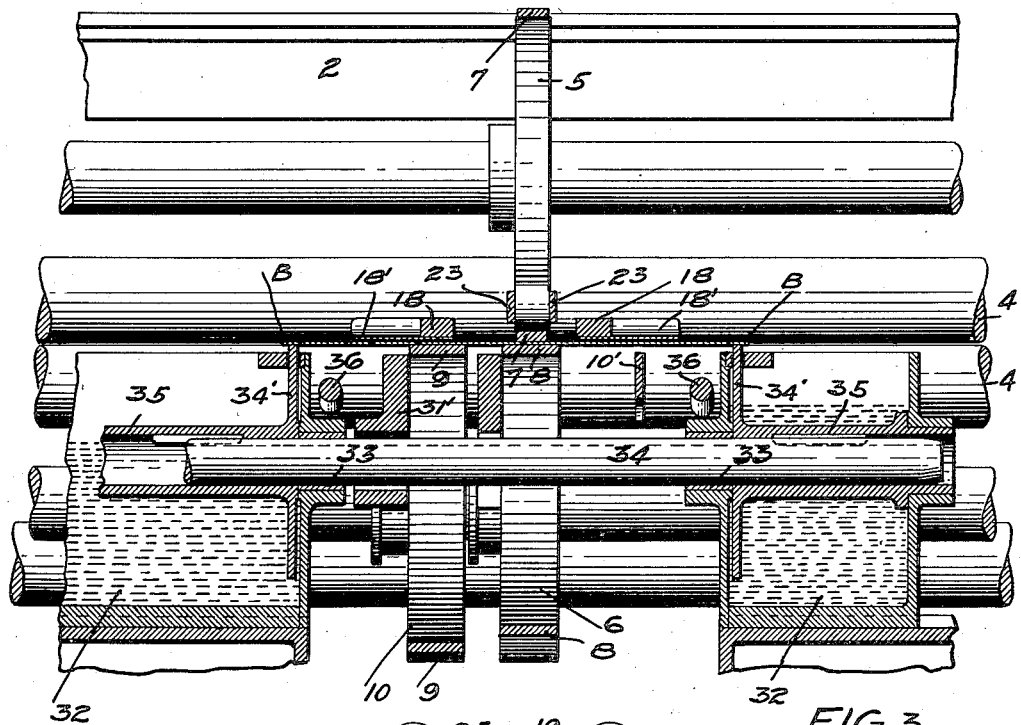
FIG. 3 v-v.
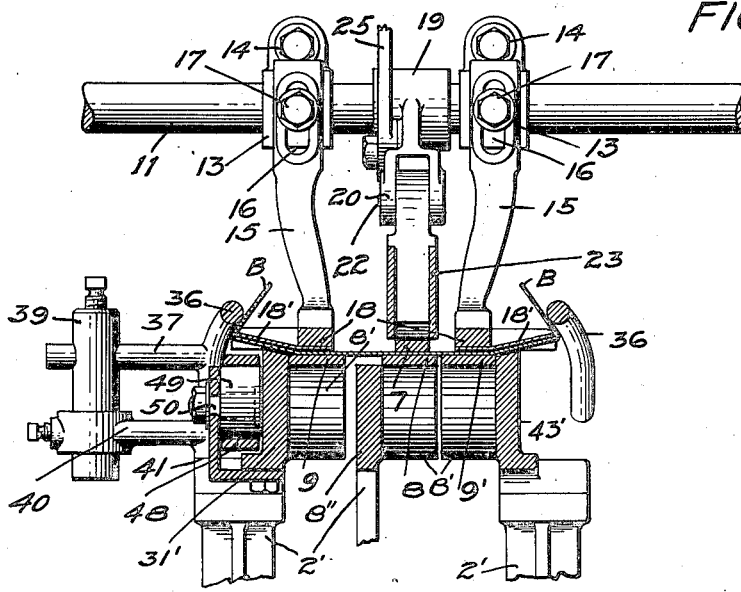
FIG. 4. w-w.
WITNESSES
INVENTOR
EDWIN G. STAUDE
BY
HIS ATTORNEYS E. G. STAUDE.
FLEXIBLE BOX MACHINE.
APPLICATION FILED JUNE 19, 1911.
1,123,945.
Patented Jan. 5, 1915.
5 SHEETS—SHEET 4.
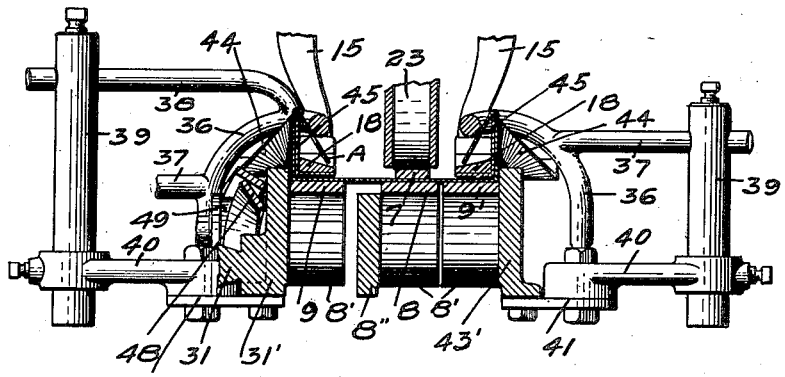
FIG. 5. X-X.
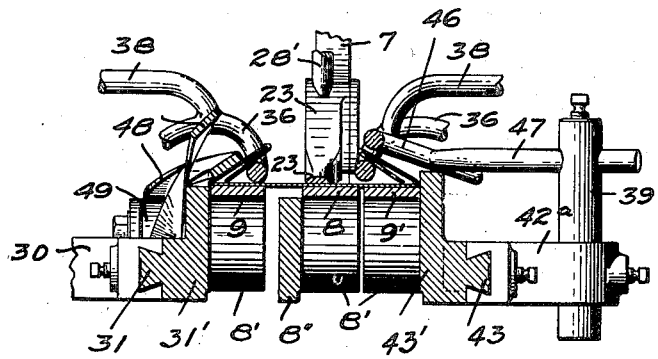
FIG. 6. Y-Y.
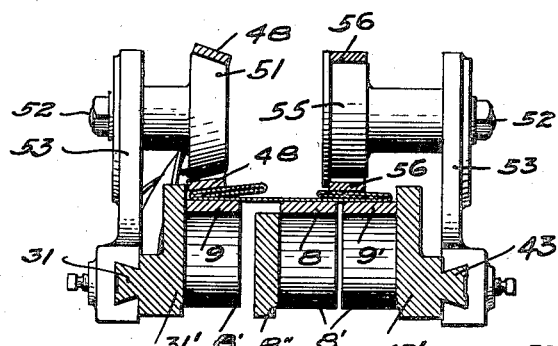
FIG. 7. Z-Z.
WITNESSES
INVENTOR
EDWIN G. STAUDE
BY
HIS ATTORNEYS

UNITED STATES PATENT OFFICE.

EDWIN GUSTAVE STAUDE, OF MINNEAPOLIS, MINNESOTA.

FLEXIBLE-BOX MACHINE.

1,123,945.  Specification of Letters Patent.  Patented Jan. 5, 1915.

Application filed June 19, 1911. Serial No. 634,169.

*To all whom it may concern:*

Be it known that I, EDWIN G. STAUDE, of Minneapolis, Hennepin county, Minnesota, have invented certain new and useful Improvements in Flexible-Box Machines, of which the following is a specification.

My invention relates to machines for making flexible boxes and particularly to that type of box used in packing packages of gum or similar articles.

The object of the invention is to provide a machine for making a succession of folds in the sides of the blanks and gluing the flaps so that when the box is discharged at the end of the machine it is only necessary to raise the folded portions to form the side walls of the package.

A further object is to provide a machine of large capacity and one in which the desired folds will be easily and quickly made.

Other objects of the invention will appear from the following detailed description.

The invention consists generally in various constructions and combinations, all as hereinafter described and particularly pointed out in the claims.

In the accompanying drawings forming part of this specification, Figure 1 is a plan view of a box making machine embodying my invention, Fig. 2 is a longitudinal, sectional view on the line *u—u* of Fig. 1, Fig. 3 is a transverse sectional view on the line *v—v* of Fig. 1, Fig. 4 is a sectional view on the line *w—w* of Fig. 1, Fig. 5 is a sectional view on the line *x—x* of Fig. 1, Fig. 6 is a sectional view on the line *y—y* of Fig. 1, Fig. 7 is a sectional view on the line *z—z* of Fig. 1, Figs. 8 and 9 are detail views of the former bars, Figs. 10, 11, 12, and 13 are perspective views, showing the box blank and the successive folds made therein in the process of forming the box.

In the drawing, 2 represents the frame of the machine, 3 is a blank feeder belt by which the blanks are delivered to the machine.

4 represents speed rolls.

5 and 6 are upper and lower rolls for the belts 7 and 8. A third belt 9 is mounted on a feed wheel 10. (See Fig. 3). A fourth belt 9', (see Figs. 2 and 4), is carried by the roll 9" located near the glue pot and supported by a bar 10'. (See Figs. 2 and 3).

A shaft 11 is mounted in brackets 12 on the machine frame and has hubs 13 capable of rotary or longitudinal adjustment on said shaft and normally locked by a clamp 14. Hangers 15 have slots 16 in their upper ends to receive bolts 17 which pass through said slots into the hubs 13. Former bars 18 are carried by the lower ends of the hangers 15 and provided with folder plates 18', preferably of sheet metal. The blanks are brought into engagement with these folder plates, as will hereafter appear. A hub 19 is mounted on the shaft 11 and has a forwardly extending, forked arm 20 and a rearwardly extending arm 21. The arm 20 has a pivotal connection at 22 with a centrally arranged presser frame 23 in which is mounted an idle roll 24 engaging the upper feed belt 7, suitable tension being maintained on said belt by the belt tightener 25. Tension devices are mounted in the frame 23 to engage the lower stretch of the belt 7, but as these form no part of my present invention, being fully illustrated and described in my pending application, Serial No. 615,999, filed March 21, 1911, I will make no claim to the same herein. I prefer also to provide idle rolls 11'' engaging the belt 8 on the underside of the machine, and a tension roll 12' adjustably supported in a hanger 13'.

The receiving end of the frame 23 has an adjustable connection at 26 with the arm 21 for the purpose of holding said end down to the work. Near the opposite end of said frame 23 an upright standard 27 is provided, supporting a horizontal pin 28 that is adjustable lengthwise in said standard and provided with a vertical socket in which a pin 28' is slidable. A spring 29 mounted on said pin 28' has its lower end in contact with the frame 23 and yieldingly holds said frame against vertical movement. The standard 27 is mounted in a block 30 and is capable of rotary and vertical adjustment therein to allow the pressure on the frame 23 to be increased or decreased and also permit the point of contact of the pin 28' with said frame to be varied.

I prefer to provide a guide 31 on the folder frame 31' on which guide the block 30 is slidable, so that the position of the block and pin supporting standard can be changed with respect to the frame 23. The blanks are held down upon the feed belts by the former bars and by the weight of the frame 23, the friction between the upper and lower feed belts being sufficient to insure the feeding of the blanks.

At the receiving end of the machine glue pots 32 are provided having suitable bearings 33 for the shaft 34, said bearings having suitable packing which will prevent the glue from working into the bearings from the glue pots. In each glue pot a glue wheel 34' is arranged, having a hub 35 in which the shaft is splined, so that as the shaft is revolved the glue wheels will be revolved also, and each wheel has a narrow face or periphery which projects above the top of its glue pot, the lower portion of the wheel being immersed in the glue. Consequently, as the shaft 34 is revolved the glue wheels will be operated also and a portion of the glue applied to the under surfaces of the blank on each longitudinal edge thereof, as indicated plainly in Fig. 3. This operation takes place as the blank enters the machine from the feed belts. The shaft 34 is capable of being withdrawn from the glue pots by endwise movement of the shafts to allow the removal of the glue wheels or the assembling of them with the shaft in the pots.

On each side of the machine I provide folders 36 provided with laterally extending arms 37 and 38. The arms 37 are adjustable lengthwise in upright standards 39 supported in arms 40 mounted at 41 on the machine frame and capable of horizontal adjustment thereon to permit the receiving ends of the folders to be moved toward or from the feed belts. One of the arms 38 is supported in a similar manner on a bracket 42 that is adjustable lengthwise of the machine by a guide 43 on the folder frame 43', and the other arm 38 is supported in substantially the same manner as the arms 37. I am thus able to move the folders lengthwise on the machine, raise or lower them, and adjust them toward or from one another until the proper working position is obtained. I prefer also to provide transverse screw shafts 2ª, 2ᵇ, and 2ᶜ, (see Fig. 1) carrying brackets 2' whereon the bars supporting the folding mechanism are transversely adjustable across the machine. I do not, however, make claim to this feature of the machine in this application, as it forms the subject-matter of a prior application, Serial No. 575,046, filed August 1, 1910.

After the blank leaves the glue wheels, its edges contact with the inwardly inclined portions of the folders 36, as indicated in Fig. 4, and as the blank is fed along its edges are turned upwardly and inwardly around the edges 44 of the folder plates 18', (see Fig. 4), said plates holding the blank in place and allowing the edges thereof to be turned inwardly along the score lines previously formed therein. These folder plates are bent gradually from a horizontal position at their receiving ends to a vertical position at 45 and the inward curvature of the folders 36 carries them across the edges of the folder plates at a point near the middle portion thereof, so that when the blanks reach the vertical portion 45 of these plates the folders will lie between the plates, as shown in Fig. 4, and these initial folds are bent in under the second fold by the initial bending of the folders 36, as illustrated in Fig. 5, the edges of the blank passing under the folders to allow the coöperation of the former bars with the vertical portions 45 of the folder plates and perform the initial steps of the second folding operation. This is illustrated in Fig. 5, where the upright portions 45 of the folder plates are clearly shown coöperating with the former bars to make the second fold in the blanks while the initial fold is held inwardly by the contact of the blank edges with the folders 36.

Near the point where the blank passes out of engagement with the folder plates 18' I prefer to provide a secondary folder 46 having an arm 47 supported in an upright standard corresponding to the support of the arms 38 and adjustable lengthwise of the machine on a bracket 42ª. This secondary folder overhangs the folded edges of the blanks, as indicated in Fig. 6, said edge being fed along between the folder 36 and the folder 46. I prefer to provide this secondary folder 46 on one side of the machine only. On the opposite side of the machine I prefer to provide a twisted belt 48 carried at one end by a pulley 49 that is adjustable in a slot 50 in the machine frame, (see Fig. 4), for the purpose of obtaining the desired tension of the belt. A bevel-faced pulley 51 engages the belt 48 and completes the second fold, the stud 52 of said pulley being vertically adjustable in a bracket 53 that is mounted for adjustment lengthwise in the machine on the guide 31. A straight-faced pulley 55 is similarly mounted near the pulley 51 and operates to press the glued edge of the blank down upon the middle portion thereof, the pressure being sufficient to cause adhesion between the contacting portions of the blank and hold the edges thereof in their folded position. On the opposite side of the machine from the belt 48 a pressure belt 56 is provided. This belt 56 is supported on pulleys corresponding substantially to the pulley 55 and mounted in a similar manner on the machine and I prefer to designate them by the same reference numerals. One edge of the blank is delivered to this belt and its function is to force down the folded edges, pressing the glued edge of the blank firmly against the middle portion in substantially the same manner as the opposite edge of the blank is operated upon.

Figure 12:
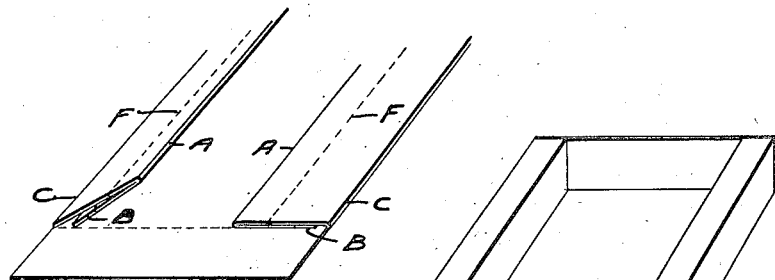
Figure 13:
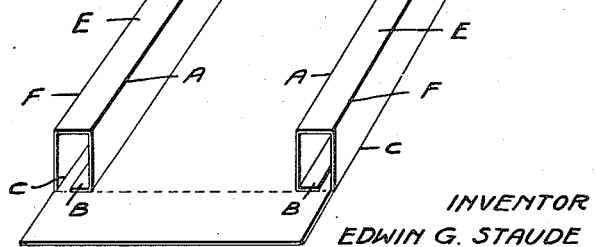

The successive steps in folding the blank are plainly illustrated in Figs. 10 to 13 inclusive. The first fold is made at point A, the glue being applied to the edge B. The second fold is made at C, as indicated in Fig. 12, and when the box is folded the operator raises the folded edges to form the side walls E of the box, as indicated in Fig. 13, the glued edge adhering to the blank and a bend being made at F by the operator when the folded portion is raised to form the wall section. These wall sections are, as shown, substantially rectangular in cross section and operate to stiffen the box materially. The box shown in Fig. 13 is of the type used for packing articles, such as packages of gum, but may also be utilized as a container for other merchandise.

I claim as my invention:—

1. The combination, with means for feeding the blanks, of former bars, plates mounted thereon and formed with a gradual curve from their receiving ends rearwardly, folders disposed adjacent to said plates and engaging the edges of the blanks and coöperating with the edges of said plates to make an initial longitudinal fold on each side of the middle portion of the blank.

2. The combination, with means for feeding the blanks, of former bars, plates mounted thereon, said plates having a substantially horizontal portion and an upright portion, folders arranged to engage the edges of the blanks and make the initial fold therein, the upright portions of said plates engaging the blanks and coöperating with said bars to make a second fold.

3. The combination, with means for feeding the blanks, of former bars, plates carried thereby and having substantially horizontal portions at their receiving ends and inwardly curved portions forming a continuation of said horizontal portions, and upright portions at the discharge ends of said plates, formers coöperating with the receiving ends of said plates to make the initial fold in the blanks, the curved and upright portions of said plates engaging the blanks and coöperating with said former bars to make the second fold in the blanks, said folders having inwardly turned portions in position to engage the initial folds during the formation of the second fold.

4. The combination, with means for feeding the blanks, of former bars, sheet metal plates mounted thereon and having substantially horizontal receiving ends and inwardly curved portions, and upright discharge ends, formers coöperating with said receiving ends to make the initial fold in the blanks, the inwardly curved portions of said plates and the upright portions thereof coöperating with said formers to make the second fold in the blanks.

5. The combination, with means for feeding the blanks, of means for making initial and secondary folds in the edges of the blanks lengthwise thereof, on each side of the middle portion of the blank continuously and successively as the blanks are fed along with the first fold and its edge brought under the second fold.

6. The combination, with means for feeding the blanks, of means for gluing the under surface thereof near its longitudinal edges, means for bending the longitudinal edges of the blank upwardly and inwardly to make the initial fold therein, means for making a second longitudinal fold therein, with the first fold and its edge brought under the second fold, and presser devices for bringing the glued edge of the initial fold into contact with the upper surface of the blank.

7. The combination, with means for feeding the blanks, of a presser frame, a transverse shaft, an arm mounted thereon and pivotally connected with the middle portion of said frame, and means yieldingly engaging the forward portion of said frame to hold it down to the work.

8. The combination, with a frame and means for feeding blanks therein, of a presser frame, a shaft, an arm mounted thereon, one end of said arm having a pivotal connection with the middle portion of said frame and a yielding means engaging the discharge end of said frame to hold it down to the work.

9. The combination, with a frame, of means for feeding the blanks, a presser frame, a transverse shaft, an arm mounted thereon and pivotally connected with the middle portion of said presser frame on one side of said shaft, means adjustably connecting said arm with said presser frame on the other side of said shaft and holding the receiving end of said frame against upward movement.

10. The combination, with a frame, of means for feeding the blanks, a presser frame, a horizontal arm whereon said presser frame is pivotally supported, a pin located beneath the discharge end of said presser frame, a support wherein said pin is slidable, and a spring arranged to hold said pin downwardly with a yielding pressure upon said frame.

11. The combination, with means for gluing and feeding the blanks, of former bars and blank engaging plates mounted thereon, folders coöperating with said plates to form, successively, primary and secondary folds in the longitudinal edges of the blanks on each side of the middle portion thereof, with the primary folds and their edges under the secondary folds, said folds being formed to provide sections rectangular in cross section on each side of the blank when unfolded, and means for pressing down the primary and secondary folds upon the surface of the blank.

12. The combination, with means for feeding the blanks, of means for gluing the surface thereon near its longitudinal edges, means for folding the longitudinal edges of the blank inwardly to make the initial fold therein, means for making a second longitudinal fold, with the initial fold and its edge under the second fold, and means for pressing the glued edge of the initial fold into contact with the surface of the blank.

In witness whereof, I have hereunto set my hand this 16th day of June, 1911.

EDWIN GUSTAVE STAUDE.

Witnesses:
GENEVIEVE E. SORENSEN,
EDWARD A. PAUL.